United States Patent [19]

Ukyo et al.

[11] Patent Number: 4,978,645
[45] Date of Patent: Dec. 18, 1990

[54] SILICON NITRIDE SINTERED BODY

[75] Inventors: Yoshio Ukyo, Aichi; Shigetaka Wada, Mie; Kazumasa Takatori, Aichi, all of Japan

[73] Assignee: Kabushiki Kaisha Toyota Chuo Kenkyusho, Aichi, Japan

[21] Appl. No.: 334,553

[22] Filed: Apr. 7, 1989

[30] Foreign Application Priority Data

Apr. 7, 1988 [JP] Japan .................. 63-86721

[51] Int. Cl.$^5$ .............................. C04B 35/58
[52] U.S. Cl. ........................ 501/98; 501/97
[58] Field of Search ............. 501/98, 97, 154

[56] References Cited

U.S. PATENT DOCUMENTS 4,547,470 10/1985 Tanase et al. .................. 501/87
4,558,018 12/1985 Matsuhiro et al. ............. 501/98
4,711,644 12/1987 Yeckley et al. ................ 501/98
4,818,635 4/1989 Ekström et al. ................ 501/98

OTHER PUBLICATIONS

*Journal of Materials Science*, (1979), vol. 14, pp. 1749–1751, "Composition and Stability of Y-Si--Al-O-N Solid Solutions Based . . . ", H. C. Starck.

Primary Examiner—William R. Dixon, Jr.
Assistant Examiner—C. Melissa Bonner
Attorney, Agent, or Firm—Oblon, Spivak, McClelland, Maier & Neustadt

[57] ABSTRACT

A silicon nitride sintered body composed of $\alpha'$-silicon nitride and $\beta'$-silicon nitride, which are present in the ratio of 0.05–0.50 to 0.50–0.95 in terms of the peak strength ratio of X-ray diffraction, and have very small crystal grain size and specific compositions. The sintered body has high strength and high toughness and is superior in oxidation resistance.

8 Claims, 1 Drawing Sheet

SILICON NITRIDE SINTERED BODY

BACKGROUND OF THE INVENTION

1. Field of the Invention

The present invention relates to a silicon nitride sintered body having high strength and toughness and outstanding oxidation resistance which can be used as a high-temperature structural material.

2. Description of the Prior Art

The sintered body of silicon nitride ($Si_3N_4$) finds use as a heat-resistant structural material for gas turbines, heat exchangers, high-temperature bearings, steel-making high-temperature rolls, and the like on account of its outstanding high-temperature strength, thermal shock resistance, and corrosion resistance.

Usually, $Si_3N_4$ is sintered together with a sintering aid (which is an oxide such as $MgO$, $MgAl_2O_4$, $Al_2O_3$, and $Y_2O_3$) because it is not easily sintered alone. It is considered that the sintering with a sintering aid is based on the liquid phase sintering mediated by the liquid phase which forms at the time of sintering. In many cases, the liquid phase remains as the glass phase in the sintered body after sintering, adversely affecting the high-temperature characteristics such as high-temperature strength and creep resistance.

Ceramic materials called sialon composed of $Si_3N_4$ and a variety of elements forming a solid solution therein are attracting attention on account of their outstanding high-temperature characteristics. They are expected to find use as high-temperature structural materials. Particularly notable are $\alpha'$-$Si_3N_4$ (commonly called $\alpha$-sialon) and $\beta'$-$Si_3N_4$ (commonly called $\beta$-sialon). The former is represented by the general formula of $M_x(Si,Al)_{12}(O,N)_{16}$ (where $0<x\leq 2$, and M denotes Li, Mg, Ca, and Y.) It is based on the $\alpha$-$Si_3N_4$ structure containing Al at the Si position, O at the N position, and other elements (such as Li, Mg, Ca, and Y) at the interstitial sites, which form an interstitial solid solution. The latter is represented by the general formula of $Si_{6-y}Al_yO_yN_{8-y}$ (where $0<y\leq 4.2$). It is based on the $\beta$-$Si_3N_4$ structure containing Al at the Si position and O at the N position, which form a solid solution.

The sintered body of $\alpha'$-$Si_3N_4$ alone or $\beta'$-$Si_3N_4$ alone is inferior in room temperature strength and toughness to other sintered bodies of $Si_3N_4$. Sintered bodies composed of $\alpha'$-$Si_3N_4$ and $\beta'$-$Si_3N_4$ are being developed as explained in the following.

It was reported in J. Materials Sci. 14 (1979) p. 1749 that mixed powder of $Si_3N_4$-$Y_2O_3$-AlN gives, upon sintering, a sintered body having a single phase of $\alpha'$-$Si_3N_4$ or a mixed phase of $\alpha'$-$Si_3N_4$ and $\beta'$-$Si_3N_4$. Japanese Patent Laid-open No. 185484/1983 discloses a sintered body having a mixed phase of $\alpha'$-$Si_3N_4$ and $\beta'$-$Si_3N_4$ which is produced from $\alpha'$-$Si_3N_4$ powder and $\beta'$-$Si_3N_4$ powder. These two sintered bodies are poor in room-temperature strength and high-temperature strength.

In addition, Japanese Patent Laid-open No. 182276/1984 discloses a sintered body composed of $\alpha'$-$Si_3N_4$ and $\beta$-$Si_3N_4$ which is produced by sintering a mixed powder of $Si_3N_4$-AlN-$Y_2O_3$-$Al_2O_3$. It is claimed that this sintered body has an improved high-temperature strength if the ratio of $\alpha'$-$Si_3N_4$ present is 0.05 to 0.7 and the crystal grain size is smaller than 40 $\mu$m measured in the direction of major axis. However, it is not satisfactory in high temperature strength at 1200° C. and above.

SUMMARY OF THE INVENTION

The present invention was completed to overcome the above-mentioned disadvantages involved in the prior art technology, after a series of researches on the ratio of $\alpha'$-$Si_3N_4$ and $\beta'$-$Si_3N_4$ present, the grain size of crystals, and the compositions. Accordingly, it is an object of the present invention to provide a $Si_3N_4$ sintered body having high strength at both room temperature and high temperatures as well as outstanding toughness and oxidation resistance.

The gist of the present invention resides in a silicon nitride sintered body composed of $\alpha'$-silicon nitride and $\beta'$-silicon nitride, characterized in that the ratio of $\alpha'$-silicon nitride and $\beta'$-silicon nitride in the peak strength ratio of X-ray diffraction is 0.05–0.50 to 0.95–0.50, and $\alpha'$-silicon nitride has an average grain size of crystal not more than 2.0 $\mu$m and $\beta'$-silicon nitride has an average grain size of crystal not more than 5.0 $\mu$m in major axis (i.e. in length) and not more than 1.0 $\mu$m in minor axis (i.e. in breadth).

The gist of the present invention also resides in a silicon nitride sintered body composed of $\alpha'$-silicon nitride and $\beta'$-silicon nitride, characterized in that the ratio of $\alpha'$-silicon nitride and $\beta'$-silicon nitride in the peak strength ratio of X-ray diffraction is 0.05–0.50 to 0.95–0.50, and $\alpha'$-silicon nitride is represented by the general formula of $M_x(Si,Al)_{12}(O,N)_{16}$ (where $0<x\leq 0.3$, and M denotes at least one of Li, Mg, Ca, and Y), and $\beta'$-silicon nitride is represented by the general formula of $Si_{6-y}Al_yO_yN_{8-y}$ (where $0<y\leq 1.0$).

The present invention provides a silicon nitride sintered body having high strengths at both room temperature and high temperatures as well as outstanding toughness and oxidation resistance.

The silicon nitride sintered body of the present invention exhibits exceptionally high strengths at both room temperature and high temperatures without sacrificing toughness. As far as strength is concerned, it is greatly improved over the conventional one having the highest strength. It retains its high strength almost unchanged even at high temperatures in excess of 1300° C., at which the conventional one sharply decreases in strength from that at room temperature. In addition, it is by far superior in fracture toughness to the conventional one. It is also by far superior in oxidation resistance at high temperatures to the conventional one. It is suitable as a heat resistant material to be used at high temperatures on account of its outstanding characteristic properties (strength, toughness, and oxidation resistance) which remain almost unchanged at even at high temperatures and which were not achieved by the conventional technology.

No complete elucidation has been made yet about the reason why the sintered body of the present invention has the above mentioned outstanding properties. However, it is presumed that they are attributable to the following.

(1) The sintered body has the structure which does not permit the grain boundary sliding to take place easily at high temperatures because $\beta'$-silicon nitride has columnar crystal grains, with the interstice thereof filled with fine equi-axis crystal grains of $\alpha'$-silicon nitride.

(2) $\alpha'$-silicon nitride and $\beta'$-silicon nitride are in the form of very fine crystal grains and hence have very few internal defects. Besides the glass phase at the grain boundary is dispersed and the relative quantity of the glass phase is reduced.

(3) The absolute quantity of the glass phase at the grain boundary is reduced when the composition of $\alpha'$-silicon nitride and $\beta'$-silicon nitride are limited as mentioned above.

(4) There are more chances for the crystal grains to come into contact with one another (i.e. the contact areas between the crystal grains are increased) because the quantity of the glass phase at the grain boundary is reduced on account of (1) and (2) (and (3)) mentioned above.

The above and other objects, features, and advantages of the present invention will become more apparent from the following description when taken in conjunction with the accompanying drawings in which a preferred embodiment of the invention is shown by way of illustrative example.

DETAILED DESCRIPTION OF THE INVENTION

Figure 1:
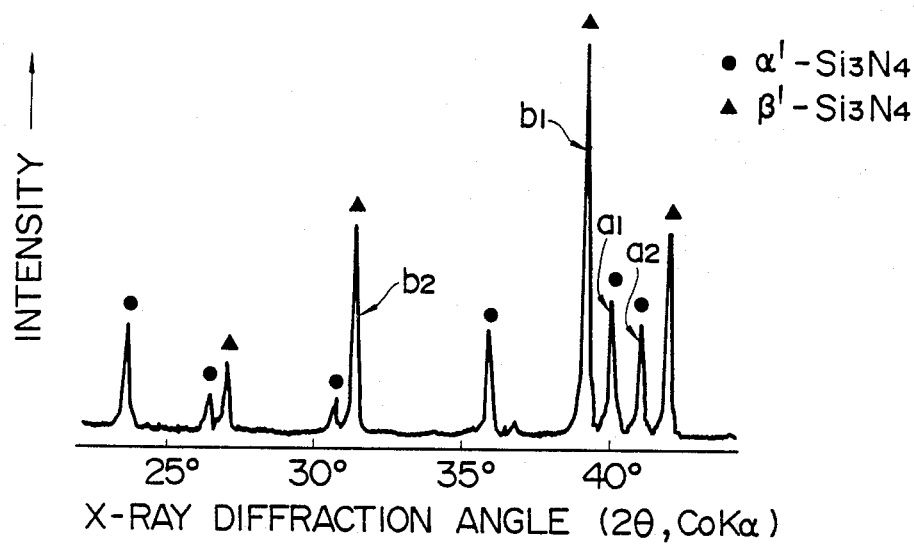
FIGS. 1 and 2 are X-ray diffraction charts of the sintered body prepared in Example 1.

The silicon nitride ($Si_3N_4$) sintered body of the present invention is composed of $\alpha'$-$Si_3N_4$ phase and $\beta'$-$Si_3N_4$ phase. The two phases have extremely fine crystal grains or have specific compositions.

$\alpha'$-$Si_3N_4$ is a compound of $\alpha$-$Si_3N_4$ structure, containing Al at the Si position, O at the N position, and other elements (at least one of Li, Mg, Ca, and Y) at the interstitial site, which form an interstitial solid solution. It is represented by the general formula of $M_x(Si,Al)_{12}(O,N)_{16}$ (where $0 < x \leq 2$, and M denotes at least one of Li, Mg, Ca, and Y). It is called $\alpha$-sialon.

$\beta'$-$Si_3N_4$ is a compound of $\beta'$-$Si_3N_4$ structure, containing Al at the Si position and 0 at the N position, which form a solid solution. It is represented by the general formula of $Si_{6-y}Al_yO_yN_{8-y}$ (where $0 < y \leq 4.2$). It is called $\beta$-sialon.

The above-mentioned general formulas representing $\alpha'$-$Si_3N_4$ and $\beta'$-$Si_3N_4$ should preferably have x and y, respectively, which are defined by $0 < x \leq 0.3$ and $0 < y \leq 1.0$. With x and y within these ranges, the sintered body has a reduced amount of glass phase at the crystal grain boundary and also has an increased strength at high temperatures.

The sintered body of the present invention should be composed of $\alpha'$-$Si_3N_4$ and $\beta'$-$Si_3N_4$ in a ratio of 0.05–0.50 to 0.50–0.95 which is determined by the X-ray diffraction peak strength ratio. With $\alpha'$-$Si_3N_4$ in a ratio lower than 0.05 or higher than 0.50, the resulting sintered body is poor in toughness and is not sufficiently improved in strength. The sintered body will have high strengths when the ratio of $\alpha'$-$Si_3N_4$ is 0.07–0.35. In the present invention, the ratio is obtained from the X-ray peak strength ratio in the following manner. The highest peak strength and the second highest peak strength of $\alpha'Si_3N_4$ are added together, and the highest peak strength and the second highest peak strength of $\beta'$-$Si_3N_4$ are added together, and the two sums are compared to each other.

$\alpha'$-$Si_3N_4$ should preferably have the crystals whose average grain size is smaller than 2.0 $\mu$m. $\beta'$-$Si_3N_4$ should preferably have the crystals whose average grain size is smaller than 5.0 $\mu$m in major axis and smaller than 1.0 $\mu$m in minor axis. If either or both of $\alpha'$-$Si_3N_4$ and $\beta'$-$Si_3N_4$ have the crystals whose grain size is larger than the above-mentioned limits, the resulting sintered body does not have the improved strength. For the higher strengths, $\alpha'$-$Si_3N_4$ should have the crystals whose average grain size is smaller than 1.0 $\mu$m, and $\beta'$-$Si_3N_4$ should have the crystals whose average grain size is smaller than 2.5 $\mu$m in major axis and smaller than 0.5 $\mu$m in minor axis. In addition, the grain size in major axis should be greater than twice that in minor axis. Otherwise, the crystal grains are equi axis grains and the sintered body is poor in strength and toughness.

The $Si_3N_4$ sintered body of the present invention can be produced by heating and sintering a mixture of $\alpha'$-$Si_3N_4$ raw material and $\beta'$-$Si_3N_4$ raw material at a high temperature.

The $\alpha'$-$Si_3N_4$ raw material may be any raw material which becomes $\alpha'$-$Si_3N_4$ in the sintered body. It includes $\alpha'$-$Si_3N_4$ itself and a mixture which forms $\alpha'$-$Si_3N_4$ by reaction which takes place during heating and sintering. Either or both of them can be used. The mixture which forms $\alpha'$-$Si_3N_4$ containing Y by reaction includes, for example, $Si_3N_4$-AlN-$Y_2O_3$, $Si_3N_4$-AlN-$Al_2O_3$-$Y_2O_3$, and $Si_3N_4$-$Al_2O_3$-$Y_2O_3$-YN.

The $\beta'$-$Si_3N_4$ raw material may be any raw material which becomes $\beta'$-$Si_3N_4$ in the sintered body. It includes $\beta'$-$Si_3N_4$ itself and a mixture which forms $\beta'$-$Si_3N_4$ by reaction which takes place during heating and sintering. Either or both of them can be used. The mixture which forms $\beta'$-$Si_3N_4$ by reaction includes, for example, $Si_3N_4$-$Al_2O_3$, $Si_3N_4$-AlN-$Al_2O_3$, and $Si_3N_4$-$Al_2O_3$-$SiO_2$.

In the case where a mixture which forms $\alpha'$-$Si_3N_4$ by reaction during heating and sintering is used as the $\alpha'$-$Si_3N_4$ raw material, it is possible to form both $\alpha'$-$Si_3N_4$ and $\beta'$-$Si_3N_4$ simultaneously if the mixing ratio of the mixture is properly controlled. For example, if it is desirable to form $\alpha'$-$Si_3N_4$ containing Y and $\beta'$-$Si_3N_4$ simultaneously, the ratio of $Si_3N_4$ to $Y_2O_3$-AlN, $Y_2O_3$-AlN-$Al_2O_3$, or YN-$Al_2O_3$-$Y_2O_3$ should be properly controlled. The reason for this is that Y, Al, and O dissolve in $Si_3N_4$ to form $\alpha'$-$Si_3N_4$, and at the same time, Al and O dissolve in $Si_3N_4$ to form $\beta'$-$Si_3N_4$. The same mixture will yield a sintered body containing $\alpha'$-$Si_3N_4$ and $\beta'$-$Si_3N_4$ in a different ratio depending on the sintering temperature and time.

If it is desirable that the sintered body should be composed of $\alpha'$-$Si_3N_4$ having two or more compositions and $\beta'$-$Si_3N_4$ having two or more compositions (in other words, x and y in the general formulas representing $\alpha'$-$Si_3N_4$ and $\beta'$-$Si_3N_4$, respectively, have two or more values), the object is achieved by using $\alpha'$-$Si_3N_4$ raw material powder and $\beta'$-$Si_3N_4$ raw material powder both having a broad particle size distribution, or by using two or more kinds of $\alpha'$-$Si_3N_4$ powder and two or more kinds of $\beta'$-$Si_3N_4$ powder which are different in composition.

A powder mixture of an $\alpha'$-$Si_3N_4$ raw material and a $\beta'$-$Si_3N_4$ raw material can be molded and the moldings can be heated and sintered in the same manner as commonly used in the production of non-oxide ceramics. Molding may be accomplished by mold pressing, rubber pressing, extrusion, slip casting, or injection molding. Sintering should preferably be carried out in an inert gas atmosphere such as nitrogen gas and argon gas or in a nonoxidizing atmosphere such as vacuum. Sintering may be performed by pressureless sintering, gas pressure sintering, hot isostatic pressing (HIP), or hot pressing. The sintering temperature should preferably be 1650°–1900° C. Sintering at temperatures lower than 1650° C. yields a sintered body which is not completely compact, and sintering at temperatures higher than 1900° C. yields a sintered body lacking sufficient strength due to excessively grown crystal grains.

In the production of the sintered body of the present invention, the mixing ratio of the $\alpha'$-$Si_3N_4$ raw material and $\beta'$-$Si_3N_4$ raw material should be properly controlled and the sintering conditions should be properly established so that the resulting sintered body contains $\alpha'$-$Si_3N_4$ and $\beta'$-$Si_3N_4$ in the prescribed ratio and also has the crystal grains of the prescribed size or the prescribed composition as mentioned above.

Having high toughness and being superior in strength and oxidation resistance at high temperatures, the $Si_3N_4$ sintered body of the present invention will find use as a heat-resistant structural material for gas turbine parts and heat exchanger parts.

The $Si_3N_4$ sintered body of the present invention may be incorporated with a variety of heat-resistant materials such as oxides, nitrides, carbides, silicides, borides, and sulfides according to its application.

EXAMPLES

The invention will be explained with reference to the following examples.

EXAMPLE 1

A sintered body composed of $\alpha'$-$Si_3N_4$ and $\beta'$-$Si_3N_4$ and having the constituent phase and crystal grains as shown in Table 1 was prepared by hot pressing from a mixture of $Si_3N_4$ powder (with the $\alpha$-ratio higher than 95%) having an average grain size smaller than 0.5 $\mu$m, $Y_2O_3$ powder having a purity of 99.9% and an average grain size smaller than 0.5 $\mu$m, and AlN powder having a purity of 99.9% and an average grain size smaller than 0.5 $\mu$m. Hot pressing was performed at 1650°–1900° C. under a pressure of 200–300 kg/cm$^2$ for 0.5–40 hours.

For the purpose of comparison, a sintered body was prepared in the same manner as mentioned above, except that the ratio of $\alpha'$-$Si_3N_4$ in the sintered body is as shown in Table 1 or the $\alpha'$-$Si_3N_4$ and $\beta'$-$Si_3N_4$ crystal grains have the average grain size outside the range specified in the invention.

Figure 2:
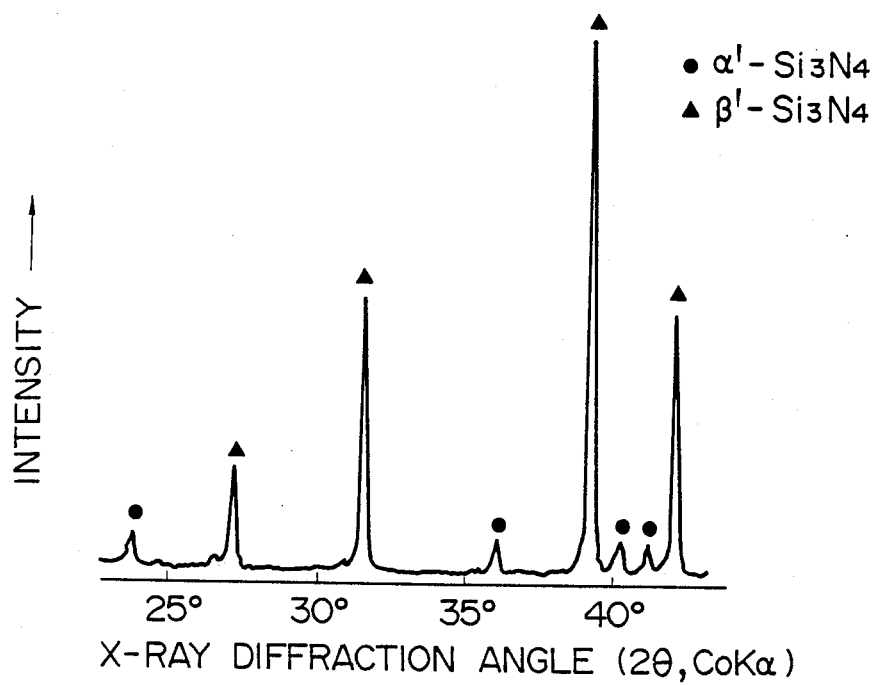

The resulting sintered body was tested for 4-point bending strength (according to JIS R-1601) and fracture toughness ($K_{IC}$) by the indentation fracture method (with a Vickers hardness meter under a load of 20 kg) using a bending test piece measuring 3×4×40 mm, cut out of the sintered body. The results are shown in Table 1. Incidentally, the ratio of $\alpha'$-$Si_3N_4$ shown in Table 1 was obtained from the X-ray diffraction peak strength ratio of the sintered body, and it was calculated on the assumption that the sum of $\alpha'$-$Si_3N_4$ and $\beta'$-$Si_3N_4$ is 1. (The same shall apply to Table 2–10.) The X-ray diffraction charts of the sintered bodies (Samples Nos. 4 and 12) are shown in FIGS. 1 and 2. The ratio of $\alpha'$-$Si_3N_4$ to $\beta'$-$Si_3N_4$ was obtained by comparing the sum of the two highest peaks $a_1$ and $a_2$ representing $\alpha'$-$Si_3N_4$ with the sum of the two highest peaks $b_1$ and $b_2$ representing $\beta'$-$Si_3N_4$.

TABLE 1

| Sample No. | Ratio of $\alpha'$-$Si_3N_4$ | Average crystal grain size ($\mu$m) $\alpha'$-$Si_3N_4$ | $\beta'$-$Si_3N_4$ Major axis | $\beta'$-$Si_3N_4$ Minor axis | 4-point bending (kg/mm$^2$) Room temp. | 1200° C. | 1300° C. | $K_{IC}$ (MPa.m$^{\frac{1}{2}}$) |
|---|---|---|---|---|---|---|---|---|
| 1 | 0.35 | 1.0 | 3.0 | 0.8 | 108 | 100 | 95 | 7.1 |
| 2 | 0.30 | 1.0 | 2.5 | 0.8 | 103 | 98 | 93 | 7.2 |
| 3 | 0.30 | 0.9 | 2.5 | 0.8 | 110 | 105 | 100 | 7.2 |
| 4 | 0.25 | 0.9 | 2.3 | 0.7 | 109 | 103 | 98 | 7.2 |
| 5 | 0.24 | 0.8 | 2.2 | 0.6 | 100 | 95 | 90 | 7.2 |
| 6 | 0.21 | 0.7 | 1.9 | 0.6 | 115 | 110 | 105 | 7.3 |
| 7 | 0.20 | 0.7 | 1.7 | 0.5 | 119 | 111 | 105 | 7.5 |
| 8 | 0.19 | 0.6 | 1.6 | 0.5 | 116 | 109 | 102 | 7.5 |
| 9 | 0.18 | 0.6 | 1.3 | 0.4 | 120 | 113 | 106 | 7.5 |
| 10 | 0.15 | 0.5 | 1.1 | 0.4 | 122 | 115 | 110 | 7.7 |
| 11 | 0.13 | 0.4 | 1.0 | 0.3 | 125 | 116 | 109 | 7.7 |
| 12 | 0.09 | 0.3 | 0.9 | 0.2 | 130 | 120 | 113 | 7.7 |
| C1 | 0.59 | 2.0 | 2.5 | 0.8 | 85 | 70 | 63 | 6.5 |
| C2 | 0.01 | 0.2 | 2.5 | 0.7 | 90 | 81 | 68 | 6.5 |
| C3 | 0.38 | 2.4 | 6.3 | 1.0 | 90 | 78 | 69 | 6.6 |
| C4 | 0.30 | 2.0 | 6.2 | 1.0 | 93 | 80 | 68 | 6.5 |
| C5 | 0.25 | 1.9 | 5.5 | 0.9 | 89 | 78 | 65 | 6.6 |
| C6 | 0.18 | 2.0 | 5.1 | 0.9 | 91 | 80 | 67 | 6.5 |

Comparative Example is indicated by Sample No. with prefix C.

It is noted from Table 1 that the sintered bodies in Example have strengths at room temperature higher than 100 kg/mm$^2$ and $K_{IC}$ values higher than 7 MPa.m$^{\frac{1}{2}}$, whereas the sintered bodies in Comparative Example have strengths at room temperature lower than 93 kg/mm$^2$ and $K_{IC}$ values lower than 6.6 MPa.m$^{\frac{1}{2}}$. Moreover, the sintered bodies in Example decreased in strength by only 10–17 kg/mm$^2$ when they were heated from room temperature to 1300° C., whereas the sintered bodies in Comparative Example decreased in strength by 21–25 kg/mm$^2$ when they were heated from room temperature to 1300° C. Many of the sintered bodies in Example marked a 4-point bending strength higher than 100 kg/mm$^2$ at 1300° C. which had never been achieved with the conventional technology.

Seven samples (Nos. 3, 6, 9, 12, C1, C4, and C6) shown in Table 1 were tested for high-temperature oxidation. The samples were oxidized at 1200° C. or 1300° C. for 100 hours in the static atmosphere. The weight and 4-point bending strength (JIS R-1601) of the samples after oxidation were measured. The results are shown in Table 2.

TABLE 2

| Sample No. | Weight gain (mg/cm$^3$) Oxidized at 1200° C. | Oxidized at 1300° C. | 4-point bending strenght at RT (kg/mm$^2$) Before oxidation | Oxidized at 1200° C. | Oxidized at 1300° C. |
|---|---|---|---|---|---|
| 3 | 0.01 | 0.05 | 110 | 108 | 100 |
| 6 | 0.01 | 0.03 | 115 | 111 | 103 |
| 9 | 0.02 | 0.03 | 120 | 115 | 110 |
| 12 | 0.01 | 0.02 | 130 | 123 | 120 |

TABLE 2-continued

| Sample No. | Weight gain (mg/cm³) Oxidized at 1200° C. | Oxidized at 1300° C. | 4-point bending strenght at RT (kg/mm²) Before oxidation | Oxidized at 1200° C. | Oxidized at 1300° C. |
| --- | --- | --- | --- | --- | --- |
| C1 | 0.05 | 0.09 | 85 | 80 | 70 |
| C4 | 0.08 | 0.10 | 80 | 67 | 59 |
| C6 | 0.07 | 0.10 | 91 | 80 | 68 |

Comparative Example is indicated by Sample No. with prefix C.

It is noted from Table 2 that the sintered bodies in Example gained weight very little and decreased in 4-point bending strength very little as compared with those in Comparative Example. This indicates their outstanding oxidation resistance.

This example demonstrates that the sintered bodies pertaining to the present invention are superior to conventional ones in toughness, strength (particularly at high temperatures), and oxidation resistance.

EXAMPLE 2

A sintered body composed of $\alpha'$-Si$_3$N$_4$ and $\beta'$-Si$_3$N$_4$ and having the constituent phase and crystal grains as shown in Table 3 was prepared by pressureless sintering from the same raw materials as used in Example 1. Pressureless sintering was performed at 1750°–1900° C. for 1–6 hours in nitrogen.

For the purpose of comparison, a sintered body was prepared in the same manner as mentioned above, except that the ratio of $\alpha'$-Si$_3$N$_4$ in the sintered body is as shown in Table 3 or the $\alpha'$-Si$_3$N$_4$ and $\beta'$-Si$_3$N$_4$ crystal grains have the average grain size outside the range specified in the invention.

The resulting sintered body was tested for 4-point bending strength and fracture toughness in the same manner as in Example 1. The results are shown in Table 3.

kg/mm² than those of sintered bodies in Comparative Example.

Seven samples (Nos. 15, 17, 20, 22, C7, C9, and C11) shown in Table 3 were tested for high-temperature oxidation in the same manner as in Example 1. The results are shown in Table 4.

TABLE 4

| Sample No. | Weight gain (mg/cm³) Oxidized at 1200° C. | Oxidized at 1300° C. | 4-point bending strenght at RT (kg/mm²) Before oxidation | Oxidized at 1200° C. | Oxidized at 1300° C. |
| --- | --- | --- | --- | --- | --- |
| 15 | 0.05 | 0.08 | 87 | 85 | 80 |
| 17 | 0.04 | 0.07 | 86 | 85 | 82 |
| 20 | 0.04 | 0.05 | 92 | 90 | 87 |
| 22 | 0.03 | 0.03 | 95 | 90 | 88 |
| C7 | 0.10 | 0.25 | 70 | 60 | 48 |
| C9 | 0.11 | 0.28 | 71 | 59 | 49 |
| C11 | 0.10 | 0.24 | 77 | 62 | 51 |

Comparative Example is indicated by Sample No. with prefix C.

It is noted from Table 4 that the sintered bodies in Example gained weight very little and decreased in 4-point bending strength very little as compared with those in Comparative Example. This indicates their outstanding oxidation resistance.

EXAMPLE 3

A sintered body composed of $\alpha'$-Si$_3$N$_4$ and $\beta'$-Si$_3$N$_4$ and having the constituent phase and crystal grains as shown in Table 5 was prepared by hot pressing from a mixture of $\alpha'$-Si$_3$N$_4$ powder of different compositions having an average grain size smaller than 0.5 μm (Y$_x$(Si,Al)$_{12}$(O,H)$_{16}$; $0.3 \leq x \leq 0.6$) and $\beta'$Si$_3$N$_4$ powder of different compositions having an average grain size smaller than 0.7 μm (Si$_{6-y}$Al$_y$O$_y$N$_{8-y}$; $0.5 \leq y \leq 3.0$), and optionally at least one of Si$_3$N$_4$ powder (with the α-ratio higher than 95%) having an average grain size smaller than 0.5 μm and Y$_2$O$_3$ powder and AlN powder having

TABLE 3

| Sample No. | Ratio of $\alpha'$-Si$_3$N$_4$ | Average crystal grain size (μm) $\alpha'$Si$_3$N$_4$ | $\beta'$-Si$_3$N$_4$ Major axis | $\beta'$-Si$_3$N$_4$ Minor Axis | 4-point bending (kg/mm²) Room temp. | 1200° C. | 1300° C. | K$_{IC}$ (MPa.m$^{\frac{1}{2}}$) |
| --- | --- | --- | --- | --- | --- | --- | --- | --- |
| 13 | 0.40 | 1.3 | 3.2 | 0.9 | 85 | 78 | 69 | 7.0 |
| 14 | 0.32 | 1.0 | 2.9 | 0.8 | 83 | 75 | 67 | 7.2 |
| 15 | 0.31 | 0.9 | 2.7 | 0.7 | 87 | 80 | 70 | 7.2 |
| 16 | 0.25 | 1.0 | 2.7 | 0.7 | 90 | 81 | 72 | 7.2 |
| 17 | 0.25 | 0.8 | 2.5 | 0.5 | 86 | 79 | 68 | 7.4 |
| 18 | 0.21 | 0.7 | 2.3 | 0.5 | 85 | 77 | 65 | 7.4 |
| 19 | 0.21 | 0.6 | 2.1 | 0.4 | 88 | 81 | 73 | 7.5 |
| 20 | 0.19 | 0.6 | 2.0 | 0.4 | 92 | 83 | 74 | 7.5 |
| 21 | 0.13 | 0.5 | 1.9 | 0.3 | 90 | 79 | 70 | 7.6 |
| 22 | 0.09 | 0.5 | 1.8 | 0.3 | 95 | 82 | 71 | 7.6 |
| C7 | 0.61 | 2.7 | 3.8 | 0.9 | 70 | 59 | 43 | 6.5 |
| C8 | 0.02 | 0.9 | 3.1 | 0.8 | 80 | 66 | 57 | 6.6 |
| C9 | 0.35 | 2.5 | 6.0 | 1.1 | 71 | 57 | 46 | 6.5 |
| C10 | 0.28 | 1.7 | 5.9 | 1.0 | 73 | 59 | 48 | 6.6 |
| C11 | 0.13 | 2.3 | 4.8 | 0.9 | 77 | 60 | 51 | 6.6 |

Comparative Example is indicated by Sample No. with prefix C.

It is noted from Table 3 that the sintered bodies in Example have strengths at room temperature higher than 83 kg/mm² and K$_{IC}$ values higher than 7 MPa.m$^{\frac{1}{2}}$, whereas the sintered bodies in Comparative Example have strengths at room temperature lower than 80 kg/mm² and K$_{IC}$ values lower than 6.6 MPa.m$^{\frac{1}{2}}$. Moreover, the sintered bodies in Example have strengths at 1200° C. and 1300° C. which are higher by 10–20 an average grain size smaller than 0.7 μm. Hot pressing was performed at 1600°–1900° C. under a pressure of 200–300 kg/cm² for 0.25–4.0 hours.

The resulting sintered body was tested for 4-point bending strength and fracture toughness in the same manner as in Example 1. The results are shown in Table 5.

TABLE 5

| Sample No. | Ratio of $\alpha'$-Si$_3$N$_4$ | Average crystal grain size ($\mu$m) | | | 4-point bending (kg/mm$^2$) | | | $K_{IC}$ (MPa.m$^{\frac{1}{2}}$) |
|---|---|---|---|---|---|---|---|---|
| | | $\alpha'$-Si$_3$N$_4$ | $\beta'$-Si$_3$N$_4$ Major axis | $\beta'$-Si$_3$N$_4$ Minor axis | Room temp. | 1200° C. | 1300° C. | |
| 23 | 0.35 | 1.0 | 2.7 | 0.9 | 110 | 100 | 95 | 7.1 |
| 24 | 0.30 | 0.9 | 2.6 | 0.8 | 111 | 101 | 93 | 7.1 |
| 25 | 0.27 | 0.8 | 2.5 | 0.8 | 113 | 98 | 90 | 7.1 |
| 26 | 0.24 | 0.8 | 2.3 | 0.6 | 118 | 110 | 105 | 7.2 |
| 27 | 0.22 | 0.7 | 2.2 | 0.5 | 120 | 108 | 100 | 7.2 |
| 28 | 0.20 | 0.7 | 2.0 | 0.5 | 122 | 112 | 107 | 7.3 |
| 29 | 0.19 | 0.7 | 1.8 | 0.4 | 133 | 120 | 113 | 7.5 |
| 30 | 0.15 | 0.6 | 1.7 | 0.4 | 130 | 121 | 108 | 7.5 |
| 31 | 0.11 | 0.6 | 1.2 | 0.3 | 135 | 123 | 114 | 7.7 |
| 32 | 0.09 | 0.5 | 1.0 | 0.3 | 142 | 120 | 112 | 7.7 |
| C12 | 0.60 | 2.0 | 4.5 | 1.4 | 90 | 75 | 60 | 6.5 |
| C13 | 0.02 | 0.3 | 1.0 | 0.5 | 87 | 78 | 70 | 6.5 |
| C14 | 0.10 | 0.4 | 5.2 | 1.2 | 88 | 75 | 63 | 6.6 |
| C15 | 0.40 | 2.5 | 4.8 | 1.1 | 93 | 80 | 68 | 6.6 |
| C16 | 0.18 | 1.0 | 5.7 | 1.5 | 95 | 83 | 72 | 6.5 |

Comparative Example is indicated by Sample No. with prefix C.

It is noted from Table 5 that the sintered bodies in Example have strengths at room temperature higher than 110 kg/mm$^2$ and K$_{IC}$ values higher than 7.1 MPa.m$^{\frac{1}{2}}$, whereas the sintered bodies in Comparative Example have strengths at room temperature lower than 95 kg/mm$^2$ and K$_{IC}$ values lower than 6.6 MPa m$^{\frac{1}{2}}$. Moreover, many of the sintered bodies in Example marked a 4-point bending strength higher than 100 kg/mm$^2$ at 1300° C. which had never been achieved with the conventional technology.

EXAMPLE 4

A sintered body composed of $\alpha'$-Si$_3$N$_4$ and $\beta'$-Si$_3$N$_4$ and having the constituent phase and crystal grains as shown in Table 6 was prepared by pressureless sintering from the same raw materials as used in Example 3. Pressureless sintering was performed at 1750°–1900° C. for 1–6 hours in nitrogen.

For the purpose of comparison, a sintered body was prepared in the same manner as mentioned above, except that the ratio of $\alpha'$-Si$_3$N$_4$ in the sintered body is as shown in Table 6 or the $\alpha'$-Si$_3$N$_4$ and $\beta'$-Si$_3$N$_4$ crystal grains have the average grain size outside the range specified in the invention.

The resulting sintered body was tested for 4-point bending strength and fracture toughness in the same manner as in Example 1. The results are shown in Table 6.

TABLE 6

| Sample No. | Ratio of $\alpha'$-Si$_3$N$_4$ | Average crystal grain size ($\mu$m) | | | 4-point bending (kg/mm$^2$) | | | $K_{IC}$ (MPa.m$^{\frac{1}{2}}$) |
|---|---|---|---|---|---|---|---|---|
| | | $\alpha'$-Si$_3$N$_4$ | $\beta'$-Si$_3$N$_4$ Major axis | $\beta'$-Si$_3$N$_4$ Minor axis | Room temp. | 1200° C. | 1300° C. | |
| 33 | .040 | 1.3 | 3.5 | 0.9 | 85 | 77 | 70 | 7.0 |
| 34 | 0.33 | 1.3 | 3.0 | 0.9 | 85 | 77 | 69 | 7.2 |
| 35 | 0.31 | 1.0 | 2.8 | 0.8 | 87 | 80 | 70 | 7.2 |
| 36 | 0.25 | 1.0 | 2.7 | 0.7 | 90 | 81 | 72 | 7.2 |
| 37 | 0.25 | 0.8 | 2.5 | 0.7 | 86 | 79 | 68 | 7.4 |
| 38 | 0.21 | 0.7 | 2.5 | 0.6 | 87 | 78 | 67 | 7.4 |
| 39 | 0.21 | 0.6 | 2.3 | 0.4 | 88 | 81 | 73 | 7.5 |
| 40 | 0.19 | 0.6 | 2.0 | 0.4 | 92 | 83 | 74 | 7.5 |
| 41 | 0.15 | 0.5 | 1.9 | 0.3 | 90 | 78 | 70 | 7.6 |
| 42 | 0.10 | 0.5 | 1.9 | 0.3 | 95 | 83 | 71 | 7.6 |
| C17 | 0.60 | 2.7 | 4.5 | 0.9 | 70 | 58 | 40 | 6.6 |
| C18 | 0.03 | 0.9 | 3.1 | 0.7 | 75 | 63 | 52 | 6.6 |
| C19 | 0.35 | 2.5 | 6.0 | 1.2 | 70 | 57 | 46 | 6.5 |
| C20 | 0.27 | 1.7 | 5.5 | 1.1 | 72 | 56 | 45 | 6.6 |
| C21 | 0.13 | 2.2 | 4.8 | 1.0 | 73 | 60 | 52 | 6.6 |

Comparative Example is indicated by Sample No. with prefix C.

It is noted from Table 6 that the sintered bodies in Example have strengths at room temperature higher than 85 kg/mm$^2$ and K$_{IC}$ values higher than 7 MPa.m$^{\frac{1}{2}}$, whereas the sintered bodies in Comparative Example have strengths at room temperature lower than 75 kg/mm$^2$ and K$_{IC}$ values lower than 6.6 MPa.m$^{\frac{1}{2}}$. Moreover, the sintered bodies in Example have strengths at 1200° C. and 1300° C. which are higher by 10–20 kg/mm$^2$ than those of sintered bodies in Comparative Example.

EXAMPLE 5

A sintered body composed of $\alpha'$-Si$_3$N$_4$ and $\beta'$-Si$_3$N$_4$ and having the constituent phase and crystal grains as shown in Table 7 was prepared by hot pressing from a mixture of $\alpha'$-Si$_3$N$_4$ containing Y and having an average grain size smaller than 0.5 $\mu$m and $\beta'$-Si$_3$N$_4$ powder having an average grain size smaller than 0.5 $\mu$m. Hot pressing was performed under the same conditions as in Example 1. The resulting sintered body was tested for 4-point bending strength and fracture toughness in the same manner as in Example 1. The results are shown in Table 7.

TABLE 7

| Sample No. | Ratio of $\alpha'$-Si$_3$N$_4$ | Average crystal grain size ($\mu$m) | | | 4-point bending (kg/mm$^2$) | | | $K_{IC}$ (MPa.m$^{\frac{1}{2}}$) |
|---|---|---|---|---|---|---|---|---|
| | | $\alpha'$-Si$_3$N$_4$ | $\beta'$-Si$_3$N$_4$ Major axis | $\beta'$-Si$_3$N$_4$ Minor axis | Room temp. | 1200° C. | 1300° C. | |
| 43 | 0.38 | 1.1 | 2.8 | 0.9 | 112 | 101 | 96 | 7.1 |
| 44 | 0.35 | 1.0 | 2.7 | 0.9 | 110 | 102 | 95 | 7.1 |
| 45 | 0.30 | 0.9 | 2.7 | 0.8 | 111 | 100 | 93 | 7.1 |
| 46 | 0.24 | 0.8 | 2.5 | 0.8 | 118 | 107 | 95 | 7.2 |
| 47 | 0.22 | 0.8 | 2.3 | 0.7 | 120 | 110 | 104 | 7.2 |
| 48 | 0.20 | 0.7 | 2.0 | 0.7 | 127 | 112 | 103 | 7.4 |
| 49 | 0.19 | 0.6 | 1.9 | 0.6 | 133 | 115 | 110 | 7.5 |
| 50 | 0.15 | 0.6 | 1.5 | 0.5 | 130 | 117 | 109 | 7.6 |
| 51 | 0.11 | 0.6 | 1.1 | 0.5 | 137 | 120 | 111 | 7.7 |
| 52 | 0.10 | 0.5 | 1.0 | 0.4 | 143 | 122 | 114 | 7.7 |
| C22 | 0.52 | 1.9 | 4.8 | 1.5 | 88 | 80 | 72 | 6.6 |
| C23 | 0.03 | 0.3 | 1.1 | 0.5 | 87 | 78 | 69 | 6.5 |
| C24 | 0.11 | 0.5 | 5.3 | 1.8 | 91 | 82 | 73 | 6.5 |
| C25 | 0.42 | 2.4 | 3.2 | 0.9 | 90 | 80 | 70 | 6.6 |
| C26 | 0.15 | 1.0 | 5.1 | 1.3 | 93 | 81 | 71 | 6.6 |

Comparative Example is indicated by Sample No. with prefix C.

It is noted from Table 7 that the sintered bodies in Example have strengths at room temperature higher than 109 kg/mm$^2$ and K$_{IC}$ values higher than 7.1 MPa.m$^{\frac{1}{2}}$, whereas the sintered bodies in Comparative Example have strengths at room temperature lower than 93 kg/mm$^2$. Moreover, the sintered bodies in Example have strengths at 1200° C. and 1300° C. which are higher than those of the sintered bodies in Comparative Example.

EXAMPLE 6

A sintered body composed of $\alpha'$-Si$_3$N$_4$ and $\beta'$-Si$_3$N$_4$ and having the constituent phase and crystal grains as shown in Table 8 was prepared by pressureless sintering from the same raw materials as used in Example 5. Pressureless sintering was performed at 1750°-1900° C. for 1-6 hours in nitrogen.

For the purpose of comparison, a sintered body was prepared in the same manner as mentioned above, except that the ratio of $\alpha'$-Si$_3$N$_4$ in the sintered body is as shown in Table 8 or the $\alpha'$-Si$_3$N$_4$ and $\beta'$-Si$_3$N$_4$ crystal grains have the average grain size outside the range specified in the invention.

The resulting sintered body was tested for 4-point bending strength and fracture toughness in the same manner as in Example 1. The results are shown in Table 8.

Example have strengths at temperature lower than 75 kg/mm$^2$. Moreover, the sintered bodies in Example have strengths at 1200° C. and 1300° C. which are higher than those of the sintered bodies in Comparative Example.

EXAMPLE 7

A sintered body composed of $\alpha'$-Si$_3$N$_4$ and $\beta'$-Si$_3$N$_4$ and having the constituent phase and crystal grains as shown in Table 9 was prepared by hot pressing from $\alpha'$-Si$_3$n$_4$ containing Y and having an average grain size smaller than 0.5 $\mu$m and Si$_3$N$_4$ powder (with the $\alpha$ ratio higher than 95%) having an average grain size smaller than 0.5 $\mu$m. Hot pressing was performed at 1650°-1900° C. under a pressure of 200-300 kg/cm$^2$ for 0.5-10 hours.

For the purpose of comparison, a sintered body was prepared in the same manner as mentioned above, except that the ratio of $\alpha'$-Si$_3$N$_4$ in the sintered body is as shown in Table 9 or the $\alpha'$-Si$_3$N$_4$ and $\beta'$-Si$_3$N$_4$ crystal grains have the average grain size outside the range specified in the invention.

The resulting sintered body was tested for 4-point bending strength and fracture toughness in the same manner as in Example 1. The results are shown in Table 9. Incidentally, the columns "x" and "y" in Table 9 denote respectively the subscripts x and y in the formu-

TABLE 8

| Sample No. | Ratio of $\alpha'$-Si$_3$N$_4$ | Average crystal grain size ($\mu$m) | | | 4-point bending (kg/mm$^2$) | | | $K_{IC}$ (MPa.m$^{\frac{1}{2}}$) |
|---|---|---|---|---|---|---|---|---|
| | | $\alpha'$-Si$_3$N$_4$ | $\beta'$-Si$_3$N$_4$ Major axis | $\beta'$-Si$_3$N$_4$ Minor axis | Room temp. | 1200° C. | 1300° C. | |
| 53 | 0.40 | 1.2 | 3.5 | 0.9 | 86 | 76 | 70 | 7.0 |
| 54 | 0.35 | 1.2 | 3.3 | 0.9 | 85 | 77 | 70 | 7.1 |
| 55 | 0.33 | 1.1 | 3.1 | 0.8 | 85 | 77 | 68 | 7.1 |
| 56 | 0.25 | 1.0 | 2.7 | 0.7 | 89 | 76 | 70 | 7.2 |
| 57 | 0.21 | 1.0 | 2.5 | 0.7 | 86 | 78 | 70 | 7.2 |
| 58 | 0.21 | 0.9 | 2.3 | 0.6 | 88 | 79 | 69 | 7.4 |
| 59 | 0.19 | 0.9 | 2.1 | 0.5 | 90 | 81 | 70 | 7.5 |
| 60 | 0.15 | 0.7 | 2.0 | 0.4 | 90 | 80 | 70 | 7.5 |
| 61 | 0.12 | 0.6 | 1.9 | 0.4 | 95 | 82 | 74 | 7.6 |
| 62 | 0.10 | 0.5 | 1.9 | 0.3 | 98 | 84 | 73 | 7.6 |
| C27 | 0.61 | 2.5 | 4.6 | 0.9 | 70 | 60 | 48 | 6.6 |
| C28 | 0.03 | 0.9 | 3.0 | 0.6 | 75 | 67 | 59 | 6.6 |
| C29 | 0.03 | 2.1 | 6.0 | 1.2 | 72 | 63 | 50 | 6.6 |
| C30 | 0.25 | 1.8 | 5.7 | 1.1 | 71 | 61 | 52 | 6.5 |
| C31 | 0.11 | 2.2 | 4.9 | 1.0 | 73 | 60 | 51 | 6.6 |

Comparative Example is indicated by Sample No. with prefix C.

It is noted from Table 8 that the sintered bodies in Example have strengths at room temperature higher than 85 kg/mm$^2$ and K$_{IC}$ values higher than 7.0 MPa.m$^{\frac{1}{2}}$, whereas the sintered bodies in Comparative las Y$_x$(Si,Al)$_{12}$(O,N)$_{16}$ representing $\alpha'$-Si$_3$N$_4$ and Si$_{6-y}$Al$_y$O$_y$N$_{8-y}$ representing $\beta'$-Si$_3$N$_4$. The value of y was obtained from the lattice constant calculated from the X-ray diffraction pattern. The value of x was obtained from the working curve showing the relationship between the lattice constant of $\alpha'$-Si$_3$N$_4$ (calculated from the X-ray diffraction pattern) and x converted from the amount of Y in the starting materials. The sample for this purpose was prepared by sintering the same starting materials as used in Example 1 by hot pressing for a long time until an equilibrium was reached and then, quenching the sintered body. The sample composed of $\alpha'$-Si$_3$N$_4$ and $\beta'$-Si$_3$N$_4$ and the sample composed of $\alpha'$-Si$_3$N$_4$ alone were selected.

higher than 100 kg/mm$^2$ at 1300° C. which had never been achieved with the conventional technology.

EXAMPLE 8

A sintered body composed of $\alpha'$-Si$_3$N$_4$ and $\beta'$-Si$_3$N$_4$ and having the constituent phase and crystal grains as shown in Table 10 was prepared by pressureless sintering from the same raw materials as used in Example 1. Pressureless sintering was performed at 1750°–1900° C. for 1–6 hours in nitrogen.

For the purpose of comparison, a sintered body was prepared in the same manner as mentioned above, ex-

TABLE 9

| Sample No. | Ratio of $\alpha'$-Si$_3$N$_4$ | x | y | Average crystal grain size ($\mu$m) | | | 4-point bending (kg/mm$^2$) | | | $K_{IC}$ (MPa.m$^{\frac{1}{2}}$) |
|---|---|---|---|---|---|---|---|---|---|---|
| | | | | $\alpha'$-Si$_3$N$_4$ | $\beta'$-Si$_3$N$_4$ Major axis | $\beta'$-Si$_3$N$_4$ Minor axis | Room temp. | 1200° C. | 1300° C. | |
| 63 | 0.48 | 0.25 | 0.8 | 1.0 | 3.0 | 0.9 | 103 | 98 | 94 | 7.1 |
| 64 | 0.40 | 0.24 | 0.8 | 0.9 | 2.5 | 0.8 | 110 | 102 | 99 | 7.1 |
| 65 | 0.37 | 0.21 | 0.8 | 0.8 | 2.5 | 0.8 | 108 | 100 | 95 | 7.1 |
| 66 | 0.33 | 0.20 | 0.8 | 0.8 | 2.3 | 0.7 | 110 | 103 | 98 | 7.2 |
| 67 | 0.30 | 0.23 | 0.7 | 0.7 | 2.2 | 0.6 | 113 | 106 | 99 | 7.2 |
| 68 | 0.25 | 0.22 | 0.7 | 0.7 | 1.9 | 0.6 | 116 | 107 | 100 | 7.2 |
| 69 | 0.23 | 0.21 | 0.7 | 0.7 | 1.7 | 0.5 | 115 | 110 | 103 | 7.5 |
| 70 | 0.21 | 0.20 | 0.7 | 0.6 | 1.6 | 0.5 | 121 | 112 | 105 | 7.5 |
| 71 | 0.21 | 0.19 | 0.7 | 0.6 | 1.5 | 0.4 | 120 | 110 | 102 | 7.5 |
| 72 | 0.20 | 0.12 | 0.7 | 0.6 | 1.3 | 0.4 | 130 | 118 | 115 | 7.6 |
| 73 | 0.16 | 0.16 | 0.6 | 0.5 | 1.3 | 0.4 | 133 | 119 | 116 | 7.6 |
| 74 | 0.15 | 0.17 | 0.6 | 0.5 | 1.1 | 0.3 | 136 | 125 | 120 | 7.7 |
| 75 | 0.11 | 0.19 | 0.6 | 0.4 | 1.0 | 0.3 | 135 | 125 | 120 | 7.7 |
| 76 | 0.10 | 0.18 | 0.5 | 0.4 | 0.9 | 0.3 | 142 | 131 | 124 | 7.7 |
| 77 | 0.07 | 0.13 | 0.5 | 0.3 | 0.9 | 0.2 | 140 | 130 | 125 | 7.7 |
| C32 | 0.53 | 0.25 | 1.10 | 1.9 | 2.8 | 0.5 | 76 | 60 | 50 | 6.5 |
| C33 | 0.12 | 0.33 | 1.50 | 1.5 | 3.1 | 0.8 | 90 | 78 | 64 | 6.5 |
| C34 | 0.21 | 0.24 | 1.40 | 1.4 | 3.0 | 0.7 | 90 | 73 | 61 | 6.6 |
| C35 | 0.02 | 0.13 | 0.90 | 0.5 | 2.8 | 0.5 | 88 | 71 | 60 | 6.6 |
| C36 | 0.15 | 0.35 | 0.80 | 2.2 | 3.3 | 0.9 | 89 | 77 | 64 | 6.6 |

Comparative Example is indicated by Sample No. with prefix C.

It is noted from Table 9 that the sintered bodies in Example have strengths at room temperature higher than 100 kg/mm$^2$ and $K_{IC}$ values higher than 7 MPa.m$^{\frac{1}{2}}$, whereas the sintered bodies in Comparative Example have strengths at room temperature lower than 90 kg/mm$^2$ and $K_{IC}$ values lower than 6.6 MPa.m$^{\frac{1}{2}}$. Moreover, the sintered bodies in Example decreased in strength by only 9–18 kg/mm$^2$ when they were heated from room temperature to 1300° C., whereas the sintered bodies in Comparative Example decreased in strength by 25–29 kg/mm$^2$ when they were heated from room temperature to 1300° C. Many of the sintered bodies in Example marked a 4-point bending strength cept that the ratio of $\alpha'$-Si$_3$N$_4$ in the sintered body is as shown in Table 10 or the $\alpha'$-Si$_3$N$_4$ and $\beta'$-Si$_3$N$_4$ crystal grains have the average grain size outside the range specified in the invention.

The resulting sintered body was tested for 4-point bending strength and fracture toughness in the same manner as in Example 1. The results are shown in Table 10.

TABLE 10

| Sample No. | Ratio of $\alpha'$-Si$_3$N$_4$ | x | y | Average crystal grain size ($\mu$m) | | | 4-point bending (kg/mm$^2$) | | | $K_{IC}$ (MPa.m$^{\frac{1}{2}}$) |
|---|---|---|---|---|---|---|---|---|---|---|
| | | | | $\alpha'$-Si$_3$N$_4$ | $\beta'$-Si$_3$N$_4$ Major axis | $\beta'$-Si$_3$N$_4$ Minor axis | Room temp. | 1200° C. | 1300° C. | |
| 78 | 0.40 | 0.24 | 0.8 | 1.3 | 3.6 | 0.9 | 88 | 79 | 72 | 7.0 |
| 79 | 0.33 | 0.22 | 0.8 | 1.3 | 3.5 | 0.9 | 85 | 77 | 70 | 7.2 |
| 80 | 0.31 | 0.22 | 0.8 | 1.0 | 3.5 | 0.8 | 87 | 81 | 71 | 7.2 |
| 81 | 0.27 | 0.21 | 0.7 | 1.0 | 2.7 | 0.7 | 86 | 79 | 68 | 7.3 |
| 82 | 0.25 | 0.20 | 0.7 | 0.8 | 2.5 | 0.7 | 86 | 80 | 70 | 7.4 |
| 83 | 0.21 | 0.20 | 0.7 | 0.7 | 2.3 | 0.6 | 85 | 77 | 70 | 7.4 |
| 84 | 0.21 | 0.19 | 0.6 | 0.6 | 2.1 | 0.5 | 88 | 80 | 74 | 7.5 |
| 85 | 0.19 | 0.19 | 0.6 | 0.6 | 2.1 | 0.4 | 93 | 84 | 75 | 7.5 |
| 86 | 0.15 | 0.15 | 0.6 | 0.6 | 1.9 | 0.4 | 93 | 83 | 74 | 7.6 |
| 87 | 0.10 | 0.13 | 0.5 | 0.5 | 1.9 | 0.3 | 95 | 84 | 73 | 7.6 |
| C37 | 0.58 | 0.21 | 1.50 | 1.3 | 3.2 | 0.8 | 70 | 57 | 40 | 6.6 |
| C38 | 0.02 | 0.18 | 0.90 | 0.5 | 3.0 | 0.7 | 73 | 60 | 50 | 6.6 |
| C39 | 0.35 | 0.33 | 0.88 | 1.8 | 3.4 | 0.8 | 72 | 61 | 50 | 6.6 |
| C40 | 0.27 | 0.19 | 1.25 | 1.1 | 2.9 | 0.7 | 73 | 59 | 48 | 6.5 |
| C41 | 0.12 | 0.10 | 1.28 | 0.6 | 2.7 | 0.6 | 75 | 60 | 49 | 6.6 |

Comparative Example is indicated by Sample No. with prefix C.

It is noted from Table 10 that the sintered bodies in Example have strengths at room temperature higher than 85 kg/mm$^2$ and $K_{IC}$ values higher than 7 MPa.m$^{\frac{1}{2}}$, whereas the sintered bodies in Comparative Example have strengths at room temperature lower than 75 kg/mm$^2$ and $K_{IC}$ values lower than 6.6 MPa.m$^{\frac{1}{2}}$. Moreover, the sintered bodies in Example have strengths at 1200° C. and 1300° C. which are considerably higher than those of the sintered bodies in Comparative Example.

What is claimed is:

1. A sialon sintered body consisting essentially of $\alpha'$-silicon nitride and $\beta'$-silicon nitride, the ratio of said $\alpha'$-silicon nitride and said $\beta'$-silicon nitride in terms of the peak strength ratio of X-ray diffraction being 0.05–0.50 to 0.95–0.50, and said $\alpha'$-silicon nitride having an average grain size of crystal not more than 2.0 μm and said $\beta'$-silicon nitride having an average grain size of crystal not more than 5.0 μm in major axis and not more than 1.0 μm in minor axis.

2. A sialon nitride sintered body as claimed in claim 1, wherein said $\alpha'$-silicon nitride is one which is represented by the general formula of $M_x(Si,Al)_{12}(O,N)_{16}$ where $0<x2$, and M denotes at least one of Li, Mg, Ca, and Y, and said $\beta'$-silicon nitride is one which is represented by the general formula of $Si_{6-y}Al_yO_yN_{8-y}$ where $0<y<4.2$.

3. A sialon nitride sintered body as claimed in claim 1, wherein the ratio of said $\alpha'$-silicon nitride and said $\beta'$-silicon nitride in terms of the peak strength ratio of X-ray diffraction is 0.07–0.35 to 0.93–0.65.

4. A sialon nitride sintered body as claimed in claim 1, wherein said $\beta'$-silicon nitride has such an average grain size of crystal that the major axis is greater than twice the minor axis.

5. A sialon nitride sintered body as claimed in claim 1, wherein said $\alpha'$-silicon nitride has an average grain size of crystal not more than 1.0 μm and said $\beta'$-silicon nitride has an average grain size of crystal not more than 2.5 μm in minor axis.

6. A sialon sintered body as claimed in claim 1, wherein said $\alpha'$-silicon nitride is one which is represented by the general formula $M_x(Si,Al)_{12}(O,N)_{16}$ where $0<x\leq0.3$, and M is at least one of Li, Mg, Ca, and y, and said $\beta'$-silicon nitride is one which is represented by the general formula of $Si_{6-y}Al_yO_yN_{8-y}$ where $0<y\leq1.0$.

7. A sialon sintered body as claimed in claim 6, wherein said $\beta'$-silicon nitride has such an average grain size of crystal that the major axis is greater than twice the minor axis.

8. A sialon sintered body as claimed in claim 6, wherein said $\alpha'$-silicon nitride has an average grain size of crystal not more than 1.0 μm and said $\beta'$-silicon nitride has an average grain size of crystal not more than 2.5 μm in major axis and not more than 0.5 μm in minor axis.

* * * * *

UNITED STATES PATENT AND TRADEMARK OFFICE
CERTIFICATE OF CORRECTION

PATENT NO. : 4,978,645

DATED : DECEMBER 18, 1990

INVENTOR(S) : YOSHIO UKYO ET AL

It is certified that error appears in the above-identified patent and that said Letters Patent is hereby corrected as shown below:

Column 15, Claim 2, line 4, delete "0<x2", insert --$0<x\leq2$--;
line 7, delete "0<y<4.2", insert --$0<y\leq4.2$--.

Column 16, Claim 5, line 5, delete "in minor axis", insert --in major axis and not more than 0.5 μm in minor axis--.

Signed and Sealed this

Twenty-fourth Day of August, 1993

*Attest:*

BRUCE LEHMAN

*Attesting Officer*     Commissioner of Patents and Trademarks